United States Patent
Shrivastava et al.

(10) Patent No.: US 8,086,983 B2
(45) Date of Patent: Dec. 27, 2011

(54) METHOD AND SYSTEM FOR PERFORMING IMPROVED TIMING WINDOW ANALYSIS

(75) Inventors: Sachin Shrivastava, Noida (IN); Harindranath Parameswaran, Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 600 days.

(21) Appl. No.: 12/241,278

(22) Filed: Sep. 30, 2008

(65) Prior Publication Data

US 2010/0083202 A1 Apr. 1, 2010

(51) Int. Cl.
*G06F 17/50* (2006.01)
(52) U.S. Cl. .................................................. 716/115
(58) Field of Classification Search ................... 716/115
See application file for complete search history.

(56) References Cited

U.S. PATENT DOCUMENTS

| | | | |
|---|---|---|---|
| 6,449,753 B1 * | 9/2002 | Aingaran et al. | 716/115 |
| 6,499,131 B1 * | 12/2002 | Savithri et al. | 716/115 |
| 6,940,293 B2 * | 9/2005 | Ramarao et al. | 324/677 |
| 7,137,080 B2 | 11/2006 | Acar et al. | |
| 7,363,605 B1 * | 4/2008 | Kondratyev et al. | 716/113 |
| 7,458,041 B2 | 11/2008 | Hershenson et al. | |
| 7,650,580 B2 * | 1/2010 | Kucukcakar et al. | 716/100 |
| 7,673,260 B2 | 3/2010 | Chen et al. | |
| 7,739,098 B2 * | 6/2010 | Kucukcakar et al. | 703/19 |
| 7,793,239 B2 | 9/2010 | Engel et al. | |
| 7,801,718 B2 * | 9/2010 | Reddy et al. | 703/14 |
| 2005/0172250 A1 * | 8/2005 | Kucukcakar et al. | 716/6 |
| 2006/0015834 A1 * | 1/2006 | Amekawa | 716/5 |
| 2006/0112359 A1 * | 5/2006 | Becer et al. | 716/6 |
| 2008/0046848 A1 * | 2/2008 | Tetelbaum et al. | 716/6 |
| 2010/0083198 A1 | 4/2010 | Zhang et al. | |

OTHER PUBLICATIONS

Final Office Action dated Mar. 30, 2011 for U.S. Appl. No. 12/143,547.
Non-Final Office Action dated Mar. 8, 2011 for U.S. Appl. No. 12/241,519.
S. Mukhopadhyay, et al.. Modeling and estimation of total leakage current in nano-scaled CMOS devices considering the effect of parameter variation. International Symposium on Low Power Electronics and Design. Seoul, Korea, pp. 172-175, 2003.
S. Narendra, et al. Full-chip sub-threshold leakage power prediction model for sub-0.18 μm CMOS. In Proceedings of the International Symposium on Low Power Electronics and Design. Monterey, California, pp. 19-23, 2002.
R. Rao, et al. Parametric yield estimation considering leakage variability. In Proceedings of Design Automation Conderence. San Diego, California, pp. 442-447, 2004.

(Continued)

*Primary Examiner* — Stacy Whitmore
(74) *Attorney, Agent, or Firm* — Vista IP Law Group, LLP

(57) ABSTRACT

A method, system, and computer program product are disclosed for performing crosstalk analysis using first-order parameterized analysis modeling. The approach can be used to factor in the effect of process variations within the definition of timing windows. This approach allows one to bypass the simplistic assumptions related to best-case/worst-case analysis using timing windows, and provide a realistic picture of the impact of timing windows on noise analysis. The timing windows can be viewed in terms of the individual process parameter. The process parameters could be real process parameters, or virtual/computed components based on the actual process parameters. The process parameters can be used to compute overlap of timing windows for performing noise analysis.

29 Claims, 11 Drawing Sheets

OTHER PUBLICATIONS

A. Srivastava, et al. Modeling and analysis of leakage power considering within-die process variations. In Proceedings of the International Symposium on Low Power Electronics and Design. Monterey, California, pp. 64-67, 2005.

H. Chang, et al. Full-chip analysis of leakage power under process variations, including spatial correlations. In Proceedings of the ACM/IEEE Design Automation Conference. Anaheim, California, pp. 523-528, 2005.

A. Srivastava, et al. Accurate and efficient gate-level parametric yield estimation considering correlated variations in leakage power and performance. In Proceedings of Design Automation Conference. Anaheim, California, pp. 535-540, 2005.

X. Li, et al. Projection-based statistical analysis of full-chip leakage power with non-log-normal distributions. Proceedings of the 43rd annual conference on Design automation, San Francisco, California, pp. 103-108.

H. F. Dadgour, et al. Statistical Framework for Estimation of Full-Chip Leakage-Power Distribution Under Parameter Variations. IEEE Transactions on Electron Devices, Nov. 2007, vol. 52, Issue 11, pp. 2930-2945.

T. Li, et al. Statistical Analysis of Full-Chip Leakage Power Considering Junction Tunneling Leakage. DAC 2007, pp. 99-102.

Non-Final Office Action dated Sep. 17, 2010 for U.S. Appl. No. 12/143,547.

* cited by examiner

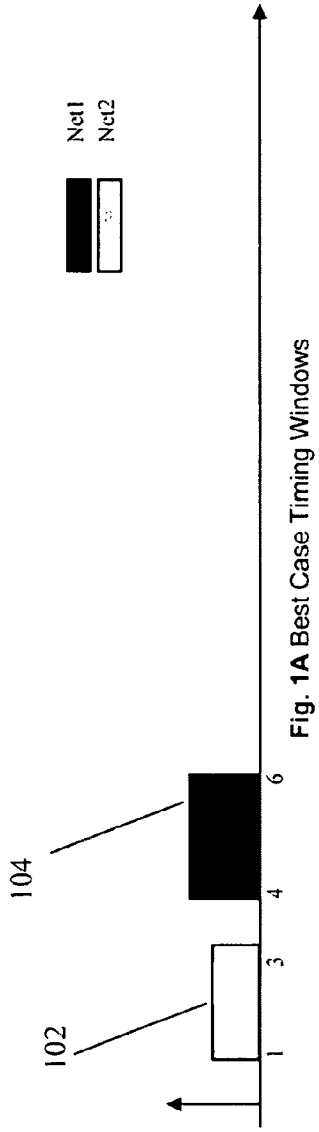
Fig. 1A Best Case Timing Windows
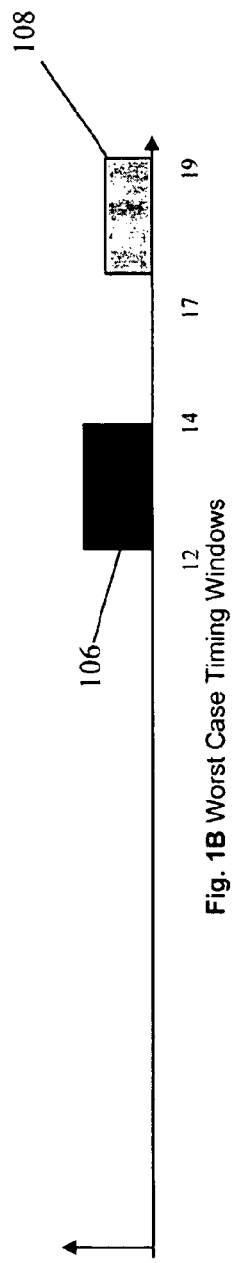
Fig. 1B Worst Case Timing Windows
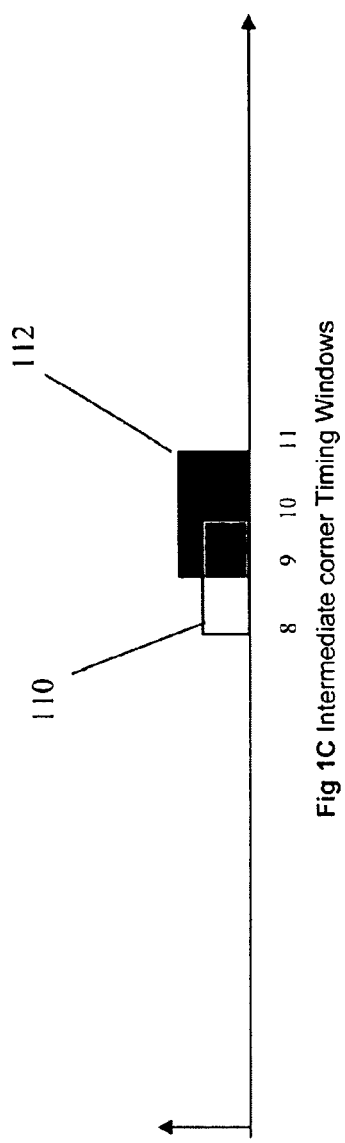
Fig 1C Intermediate corner Timing Windows

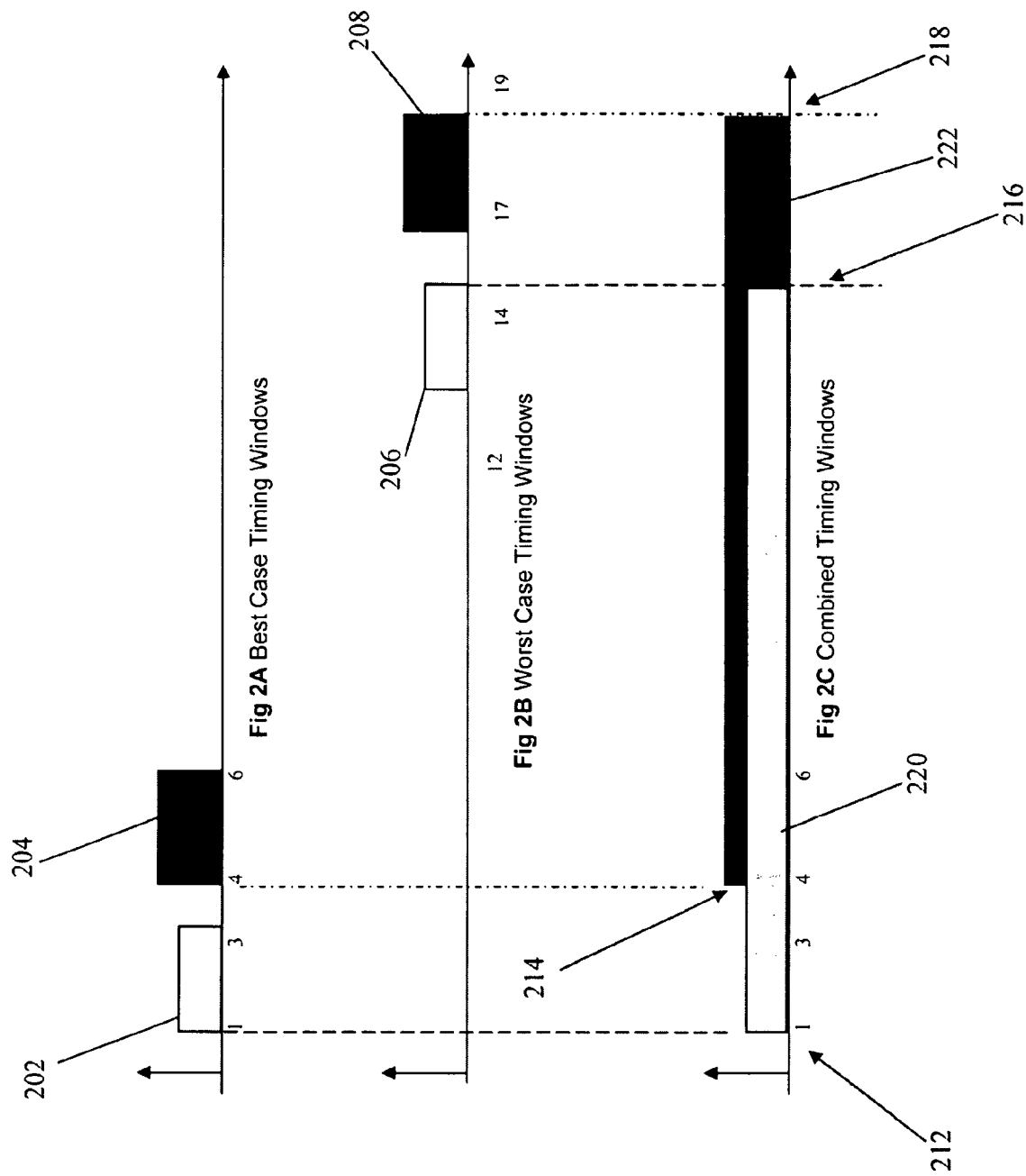

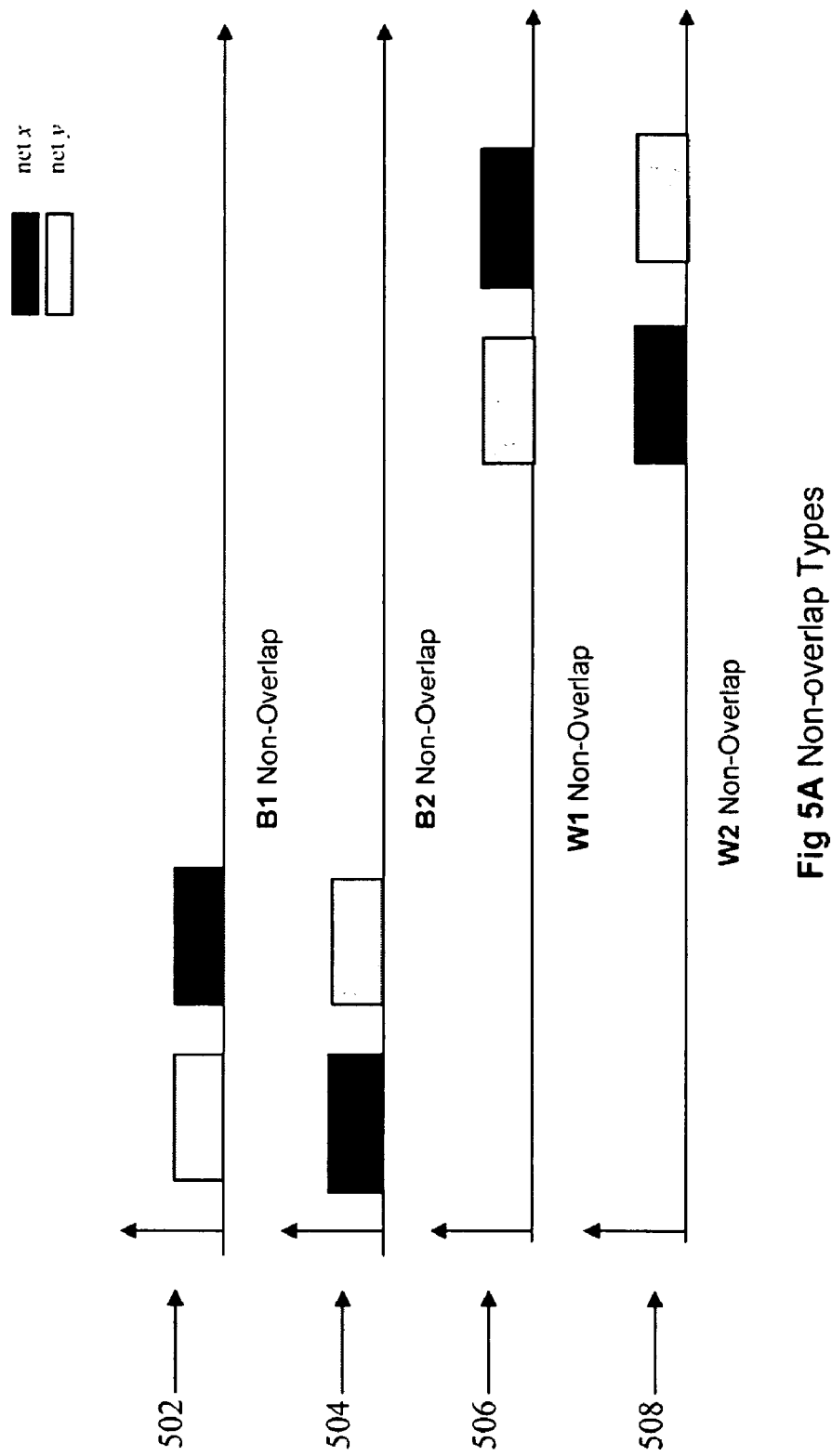
Fig 5A Non-overlap Types

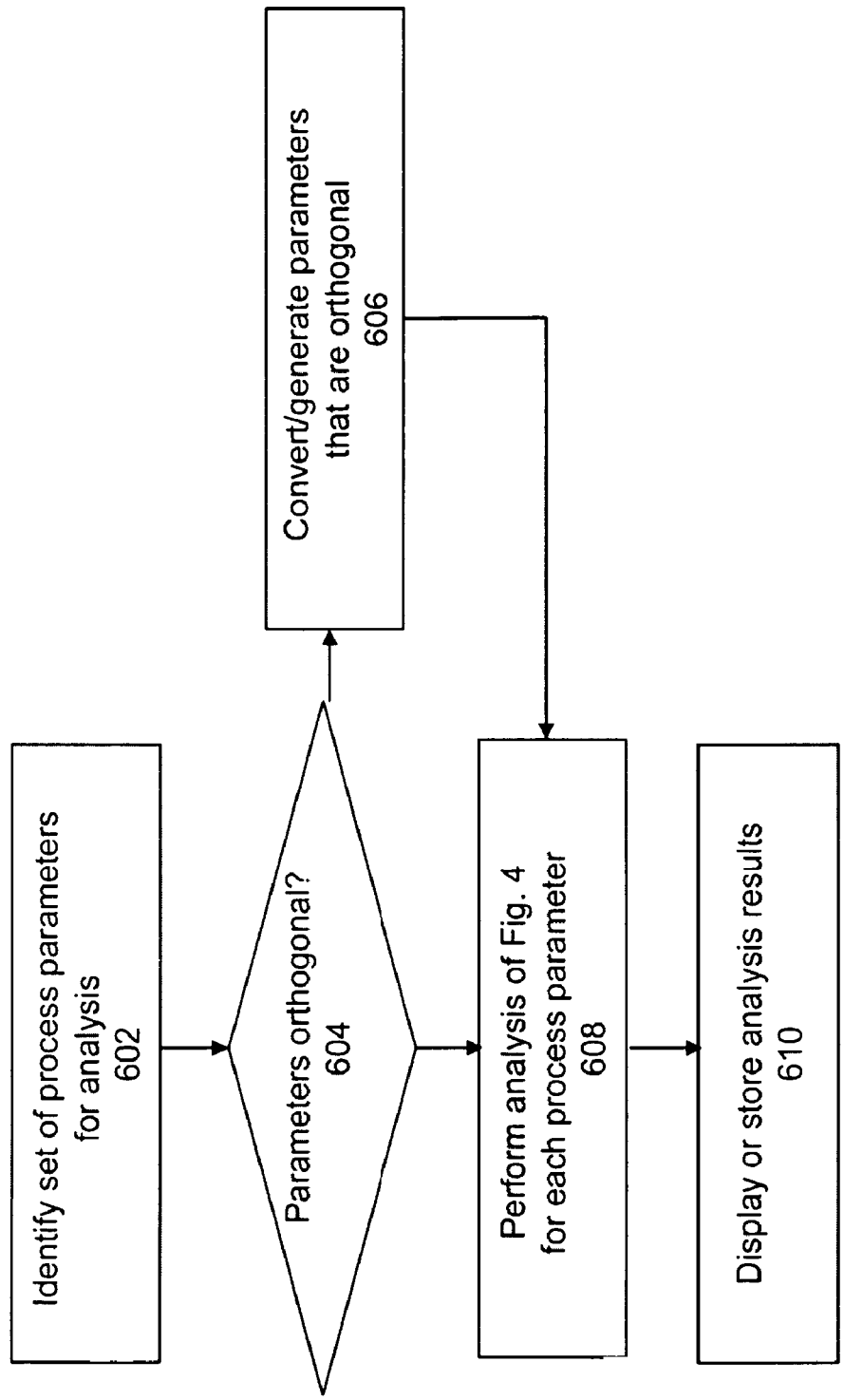

METHOD AND SYSTEM FOR PERFORMING IMPROVED TIMING WINDOW ANALYSIS

BACKGROUND AND SUMMARY

The invention is directed to an improved approach for designing, analyzing, and manufacturing integrated circuits.

An integrated circuit (IC) has a large number of electronic components, such as transistors, logic gates, diodes, wires, etc., that are fabricated by forming layers of different materials and of different geometric shapes on various regions of a-silicon wafer. Many phases of physical design may be performed with computer aided design (CAD) tools or electronic design automation (EDA) systems. To design an integrated circuit, a designer first creates high level behavior descriptions of the IC device using a high-level hardware design language. An EDA system typically receives the high level behavior descriptions of the IC device and translates this high-level design language into netlists of various levels of abstraction using a computer synthesis process. A netlist describes interconnections of nodes and components on the chip and includes information of circuit primitives such as transistors and diodes, their sizes and interconnections, for example.

An integrated circuit designer may use a set of layout EDA application programs to create a physical integrated circuit design layout from a logical circuit design. The layout EDA application uses geometric shapes of different materials to create the various electrical components on an integrated circuit and to represent electronic and circuit IC components as geometric objects with varying shapes and sizes. Typically, geometric information about the placement of the nodes and components onto the chip is determined by a placement process and a routing process. The placement process is a process for placing electronic components or circuit blocks on the chip and the routing process is the process for creating interconnections between the blocks and components according to the specified netlist. After an integrated circuit designer has created the physical design of the circuit, the integrated circuit designer then verifies and optimizes the design using a set of EDA testing and analysis tools.

Based upon the layout, photomasks are created for lithographic manufacturing of the electronic product. A photomask, or more simply a "mask," provides the master image of one layer of a given integrated chip's physical geometries. A typical photolithography system projects UV light energy on to and through the mask in order to transmit the mask pattern in reduced size to the wafer surface, where it interacts with a photosensitive coating on the wafer. Other processes may also be performed during to manufacture an integrated circuit. For example, etching, electroplated copper deposition (ECD), and chemical mechanical polishing (CMP) may be used to form interconnects for the IC.

Rapid developments in the technology and equipment used to manufacture semiconductor ICs have allowed electronics manufacturers to create smaller and more densely packed chips in which the IC components, such as wires, are located very close together. When electrical components are spaced close together, the electrical characteristics or operation of one component may affect the electrical characteristics or operation of its neighboring components. The reaction or noise that is triggered by this interference between components is called the "crosstalk" effect.

With shrinking process node sizes, the inherent effects of process variations are playing a larger factor in defining the behavior of a circuit, and in particular, the extent and effects of crosstalk on the behavior of the circuit. Process variations may arise during the process of manufacturing the IC that cause the as-manufactured product to have different characteristics or dimensions from the as-designed product. These variations are commonly caused by side-effects of the processing used to manufacture the IC. For example, optical effects of using lithographic manufacturing process may cause variations to exist in the manufactured device from the originally intended feature dimensions and geometries of the layout. Variations in feature density, widths, and heights may also occur during the CMP, etching, and plating processes.

The process of performing crosstalk analysis is very complex, and is made even more difficult because of the effects of process variations. However, in the UDSM era, it is an imperative part of the design flow that the designers adequately analyze their designs for crosstalk. This is because crosstalk can cause functional or timing failures of the chip, thus leading to significant loss of yield.

Because of the complexity for performing crosstalk analysis, analysis tools generally tend to err on the side of pessimism, on the theory that it is better for the tool to overestimate a noise, rather than take the risk of underestimating a potential point of failure. The trick then is to make sure that the pessimism in analysis is as small as possible.

One of the key methods used in noise analysis to reduce pessimism is the use of timing windows. The concept of timing windows is based upon the formation of windows in which all aggressors nets cannot typically attack (e.g., cause noise due to coupling) a victim net at the same time. Only those aggressor nets that have switching activities in the same window can potentially attack a victim at the same time. The effect of crosstalk on delay can only be seen when the victim is switching. This implies that there must be some sort of overlap between the victim and aggressor's, or set of aggressors', timing windows.

However, timing windows themselves are approximate constructs, since they do not have any equivalent analytical description as a bound-based definition. When used incorrectly, the timing windows can itself lead to excessive pessimism, or worse, optimism.

Therefore, it is clear that there is a need for an improved approach to perform crosstalk and timing analysis for an electronic design. According to some embodiments of the invention, first-order parameterized analysis modeling is used to overcome the shortcomings of the existing approaches, and factor in the effect of process variations within the definition of timing windows.

Other and additional objects, features, and advantages of the invention are described in the detailed description, figures, and claims.

BRIEF DESCRIPTION OF FIGURES

FIGS. 1A-C are used to illustrate example timing windows

FIGS. 2A-C illustrate best/worst timing windows being combined.

FIG. 5A illustrates different overlap types.

FIG. 6 shows a flow of a process for performing crosstalk analysis for multiple process parameters.

DETAILED DESCRIPTION

Figure 3:
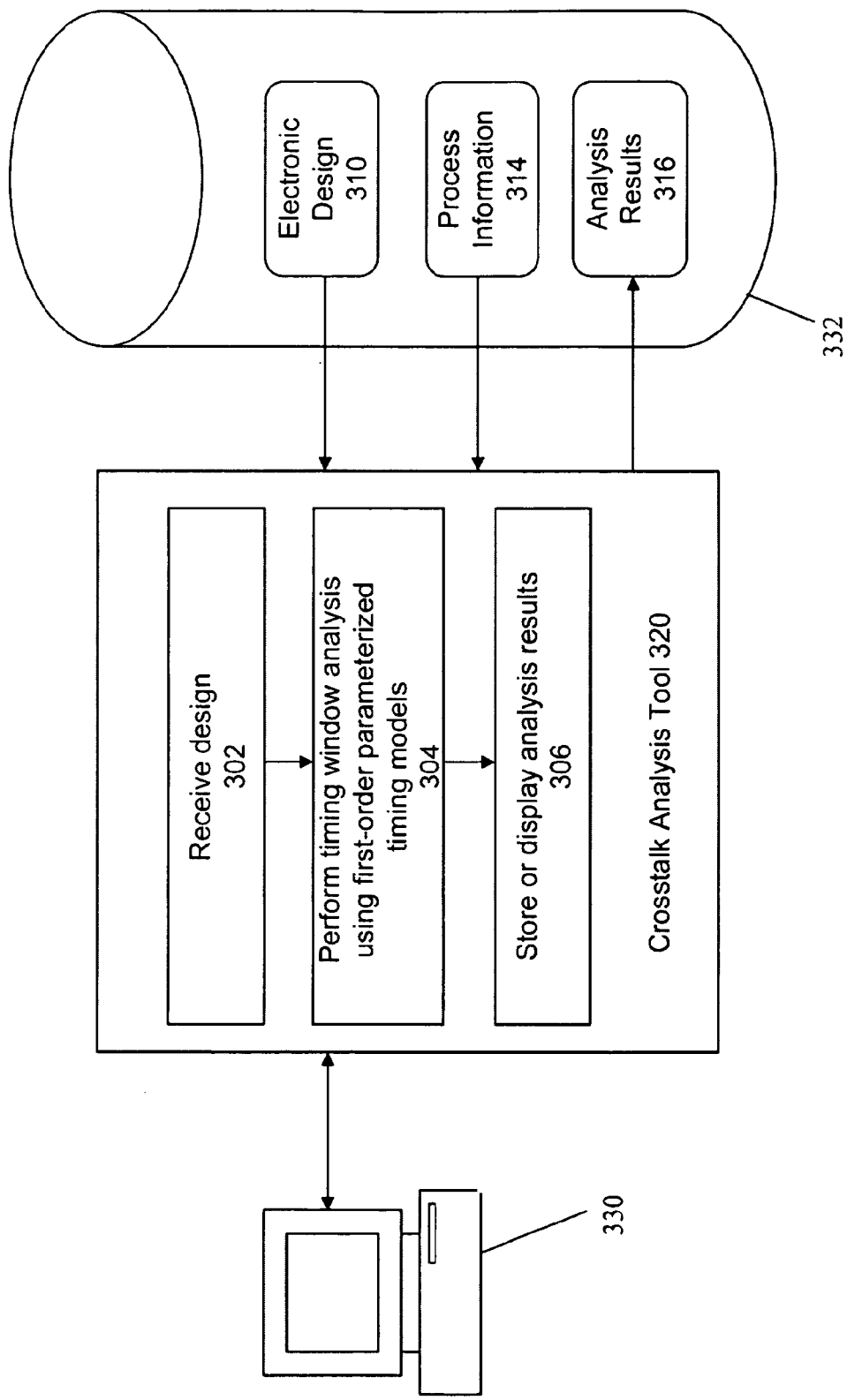
FIG. 3 illustrates a high level architectural diagram of an example system with which the invention may be implemented.

The present invention provides a method, system, and computer program product for performing analysis using timing windows. As noted above, one of the key methods used for noise analysis is the use of timing windows. According to some embodiments of the invention, first-order parameterized analysis modeling is used to overcome the shortcomings of the existing approaches, and factor in the effect of process variations within the definition of timing windows.

To explain the benefit of the present invention, it is helpful to discuss the limitations of other approaches to using timing windows. It is noted that timing windows are approximate constructs, and they therefore do not have any equivalent analytical description as a bound-based definition. When used incorrectly, the timing windows can itself lead to excessive pessimism, or worse, optimism.

A primary example of this is the use in best-case/worst-case analysis, where timing windows corresponding to the best-case corner (in terms of process parameters) and worst-case corner (again, in terms of process parameters) are used to analysis the design. In such a situation, using the timing windows of either corner (or even both) can cause a situation where an actual violation can be missed. This is because even if timing windows do not overlap at the best/worst corner, they can still overlap at an intermediate corner.

To illustrate, consider the example timing windows shown in FIGS. 1A-C. The timing windows for two nets, i.e., Net1 and Net2, are shown in these figures. The timing window for Net1 is drawn as a dark rectangle. The timing window for Net2 is drawn as a shaded rectangle. Each timing window represents a range of arrival times for signals within its respective net, from an earliest to latest arrival time. The ranges of earliest/latest arrival times for the different nets are subject to variations. As such, it is possible that there is both a best-case scenario for the arrival times and a worst-case scenario for the arrival times for both nets.

To determine whether there is a potential crosstalk problem, the timing windows for the two nets are checked to see if there is an overlap between the two sets of timing windows. If there is an overlap, then this is an indication that both nets will switch together, thereby identifying a crosstalk problem. If there is not an overlap, then this is an indication that the nets will not switch together, thereby avoiding crosstalk problems.

FIG. 1A illustrates the best-case timing windows for both Net1 and Net2. In particular, timing window 102 corresponds to Net1 and timing window 104 corresponds to Net2. It can be seen that there is no overlap between timing window 102 and timing window 104. This indicates that there is not a crosstalk problem for the best case timing windows.

FIG. 1B illustrates the worst-case timing windows for Net1 and Net2. In this figure, timing window 108 corresponds to Net1 and timing window 106 corresponds to Net2. Here again, there is no overlap between timing window 106 and timing window 108 for Net2 and Net1, respectively. As such, this indicates that that there is not a crosstalk problem for the worst case timing windows.

The problem with this approach is that even if the best/worst case corners do not indicate overlapping timing windows, it is possible for situations to exist where there is an overlap between the intermediate corner timing windows. This is illustrated in FIG. 1C, in which timing window 110 for Net2 and timing window 112 for Net1 show an overlap.

This means that the best/worst case approach for performing timing window analysis is overly optimistic, since there are potential situations where the timing windows in best/worst corners do not overlap, but the timing window due to an intermediate corner would overlap. In such a situation, using the timing windows of either corner (or even both) can cause a situation where an actual violation can be missed, since even if timing windows do not overlap at best/worst corner, they can still overlap at an intermediate corner.

Another approach is to expand the timing windows to have a range that combines the earliest and latest possible arrival times from both the best and worst case corners. In this approach pessimistic timing windows are formed by combining best/worst timing windows using following:

$$TW = (\text{Best } TW_{min}, \text{Worst } TW_{max})$$

This approach is illustrated in FIGS. 2A-C. As before, the timing windows for two nets, i.e., Net1 and Net2; are shown in these figures. The timing window for Net1 is drawn as a dark rectangle. The timing window for Net2 is drawn as a shaded rectangle.

FIG. 2A illustrates the best-case timing windows for both Net1 and Net2. In this figure, timing window 202 corresponds to Net1 and timing window 204 corresponds to Net2. It can be seen that there is no overlap between timing window 202 and timing window 204. This indicates that there are no crosstalk problems for the best-case timing windows.

FIG. 2B illustrates the worst-case timing windows for Net1 and Net2. In this figure, timing window 206 corresponds to Net1 and timing window 208 corresponds to Net2. Here again, there is no overlap between timing window 206 and timing window 208. As such, this indicates that that there is not a crosstalk problem for the worst case timing windows.

FIG. 2C shows combined timing windows for both nets. In particular, timing window 220 corresponds to Net1 and timing window 222 corresponds to Net2. The earliest range point for timing window 220 for Net1 is formed by selecting the earliest arrival time from both timing window 202 from the best-case and timing window 206 from the worst case corners. Here, the earliest arrival time from both timing windows is the earliest arrival time from timing window 202 (i.e., at 1). This selected earliest arrival time is used as the earliest bounding point 212 for timing window 220. Next, the latest range point for timing window 220 for Net1 is formed by selecting the latest arrival time from both timing window 202 from the best-case and timing window 206 from the worst case corners. Here, the latest arrival time from both timing windows is the latest arrival time from timing window 206 (i.e., at around 14). This selected latest arrival time is used as the latest bounding point 216 to the range for timing window 220.

In a similar manner, timing window 222 corresponding to Net2 is formed by creating a range having the earliest and latest arrival times for both the timing windows from both the best and worst case corners. The earliest range point for timing window 222 for Net2 is formed by selecting the earliest arrival time from both timing window 204 from the best-case and timing window 208 from the worst case corners. Here, the earliest arrival time from both timing windows is the earliest arrival time from timing window 204 (i.e., at 4). This selected earliest arrival time is used as the earliest bounding point 214 for timing window 222. Next, the latest range point for timing window 222 for Net2 is formed by selecting the latest arrival time from both timing window 204 from the best-case and timing window 208 from the worst case corners. Here, the latest arrival time from both timing windows is the latest arrival time from timing window 208 (i.e., at around 18-19). This selected latest arrival time is used as the latest bounding point 218 to the range for timing window 222.

This approach will capture any crosstalk caused by intermediate corners, since those intermediate corners will fall within the range of the combines timing windows for the nets. Therefore, this approach will address the problems identified for FIGS. 1A-C.

The problem with this approach is that it could lead to excessively large timing windows, which could be very pessimistic. It is not generally tractable to compute all possible combinations of timing windows (e.g., as distinct objects) at each point in the corner. However, it is desirable to factor in the effect of timing windows at each corner so as to avoid potential failure of the design.

According to some embodiments of the invention, crosstalk analysis is improved by using first-order parameterized analysis modeling to overcome the shortcomings of the alternative approaches, and to factor in the effect of process variations within the definition of timing windows. This approach allows one to bypass the simplistic assumptions related to best-case/worst-case analysis using timing windows, and provide a realistic picture of the impact of timing windows on noise analysis. The timing windows can be viewed in terms of the individual process parameter. The process parameters could be real process parameters, or virtual/computed components based on the actual process parameters. The process parameters can be used to compute overlap of timing windows for performing noise analysis.

FIG. 3 illustrates a high level architectural diagram of an example system with which the invention may be implemented. A user at a user station 330 utilizes an electronic design/analysis tool, e.g., a crosstalk analysis design tool 320, to perform crosstalk and timing analysis for an electronic design 310. The electronic design 310 may be stored in an electronic database 332. Process information 314 from the fabrication facility or foundry may also be stored within the database 332.

The database 332 may also include statistical information and models about processes and parameters for the electronic design 310. These models and information are generated by characterization of the design and component behavior at various conditions. As understood by those of ordinary skill in the art, these models and information can be configured to represent the effect of process variations in terms of sensitivity values. The analysis tools would use these sensitivity numbers to compute the effect of process variations for crosstalk analysis.

The crosstalk analysis tool 320 performs analysis upon an electronic design 310 and also receives process information 314 to perform the analysis. Timing analysis is performed using first-order parameterized timing models at 304. Based upon the results of the analysis, the analysis results 316 can be either, or both, stored within a computer readable medium at the database 332 or displayed at a display device at user station 330.

According to some embodiments of the invention, arrival times are modeled using the following form:

$$A = A_0 + \sum_{i=1}^{n} s_i \Delta p_i + s_{(n+1)} \Delta R$$

In this equation, $A_0$ represents the nominal value of the arrival time. $p_i$ represents the process parameter and $s_i$ is the sensitivity of arrival time to process parameter $p_i$. $\Delta R$ is the unit Gaussian random variation and $s_{n+1}\Delta R$ is the random variations in P with standard deviation $s_{(n+1)}$.

The above formula is for setup (hold) analysis, where only the latest (or the earliest) arrival time is considered, while for timing windows generation both early and late arrival times are needed. This may be re-written separately for early and late arrival times as follows:

$$E = E_0 + \sum_{i=1}^{n} e_i \Delta p_i + e_{(n+1)} \Delta R$$

$$L = L_0 + \sum_{i=1}^{n} l_i \Delta p_i + l_{(n+1)} \Delta R$$

In these equations, E represents the early arrival time and L represents the late arrival time. $E_0$ corresponds to the nominal early arrival time and $e_i$ corresponds to the sensitivity for the early arrival time. Similarly, $L_0$ corresponds to the nominal late arrival time and $l_i$ corresponds to the sensitivity for the late arrival time.

The approach described in co-pending U.S. application Ser. No. 12/143,547, filed on Jun. 20, 2008, which is hereby incorporated by reference, could be used to perform statistical modeling to implement some or all of these formulas.

Figure 4:
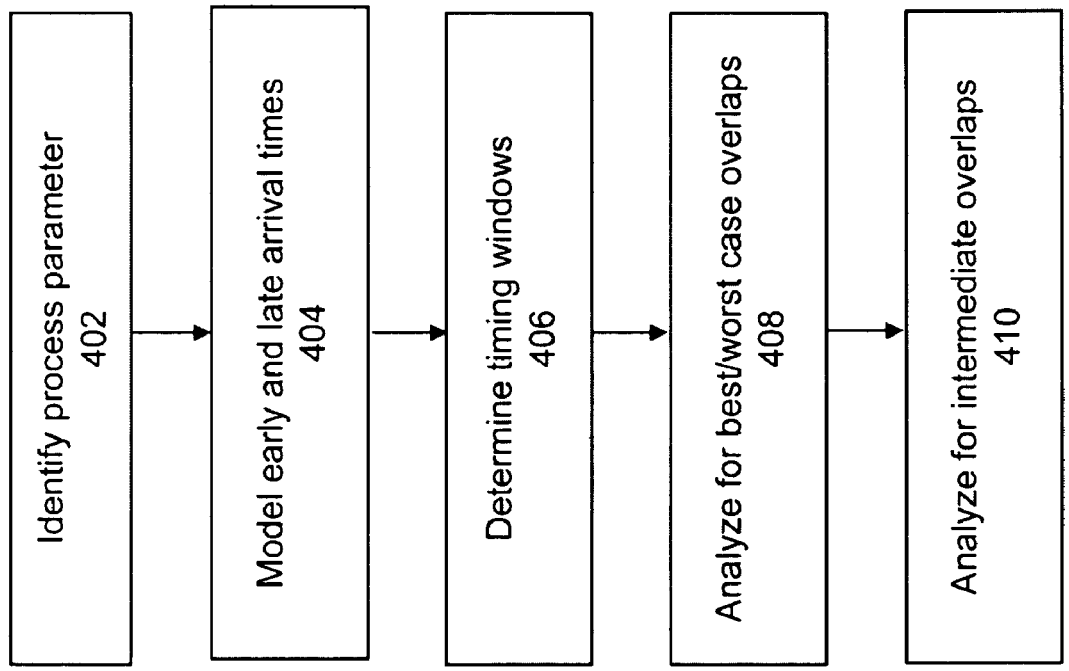
FIG. 4 shows a flow of a process for performing crosstalk analysis using first-order parameterized timing, models according to some embodiments of the invention.

FIG. 4 shows a flow of a process for performing crosstalk analysis for a single process parameter using first-order parameterized timing models according to some embodiments of the invention. At 402, the process parameter to be processed is identified. Next, at 404, the early and late-arrival times are modeled using the above formula as follows:

$$E = E_0 + e\Delta p$$

$$L = L_0 + l\Delta p$$

In these equations, e and l are sensitivities of early/late case arrival times to process parameter p. Assume that the process parameter can change from $-\Delta p_{max}$ to $\Delta p_{max}$, with these chosen to be /+3sigma values, which ensures 99.9% yield.

Timing windows are then determined at 406. The timing windows at the best corner is:

$$[E_0 - e\Delta p_{max}, L_0 - l\Delta p_{max}]$$

The timing windows for the worst corner is:

$$[E_0 + e\Delta p_{max}, L_0 + l\Delta p_{max}]$$

Consider two nets analyzed, net X and net Y. The best and worst timing windows for net X can be represented by the following:

$$[E_0^x - e^x\Delta p_{max}, L_0^x - l^x\Delta p_{max}] \text{ (Best Corner TW)}$$

$$[E_0^x + e^x\Delta p_{max}, L_0^x + l^x\Delta p_{max}] \text{ (Worst Corner TW)}$$

The best and worst timing windows for net Y can be represented by the following:

$$[E_0^y - e^y\Delta p_{max}, L_0^y - l^y\Delta p_{max}] \text{ (Best Corner TW)}$$

$$[E_0^y + e^y\Delta p_{max}, L_0^y + l^y\Delta p_{max}] \text{ (Worst Case TW)}$$

At 408, the timing windows for net Z and net Y are analyzed for any overlaps. The condition for the two nets X and Y not to overlap at the best corner is represented by the following:

$$E_0^x - e^x\Delta p_{max} > L_0^y - l^y\Delta p_{max} \text{ (Type } B1, \text{ non-overlap)}$$

or $$E_0^y - e^y\Delta p_{max} > L_0^x - l^x\Delta p_{max} \text{ (Type } B2, \text{ non-overlap)}$$

Similarly, the condition for the two nets X and Y not to overlap at the worst corner is represented by the following:

$$E_0^x + e^x \Delta p_{max} > L_0^y + l^y \Delta p_{max} \text{ (Type } W1, \text{non-overlap)}$$

or $$E_0^y + e^y \Delta p_{max} > L_0^x + l^x \Delta p_{max} \text{ (Type } W2, \text{non-overlap)}$$

FIG. 5A illustrates these overlap types, with portion 502 illustrating non-overlap type B1, portion 504 illustrating non-overlap type B2, portion 506 illustrating non-overlap type W1, and portion 508 illustrating non-overlap type W2.

Returning back to FIG. 4, conditions of overlap at intermediate corners are identified at 410. The existence of non-overlap at intermediate corners can be found using the following conditions:

If (W1 and B1) or (W2 and B2).

This ensures that net X and net Y will not overlap for any intermediate value of the process parameter in the range $[-\Delta p_{max}, \Delta p_{max}]$.

Figure 5B:
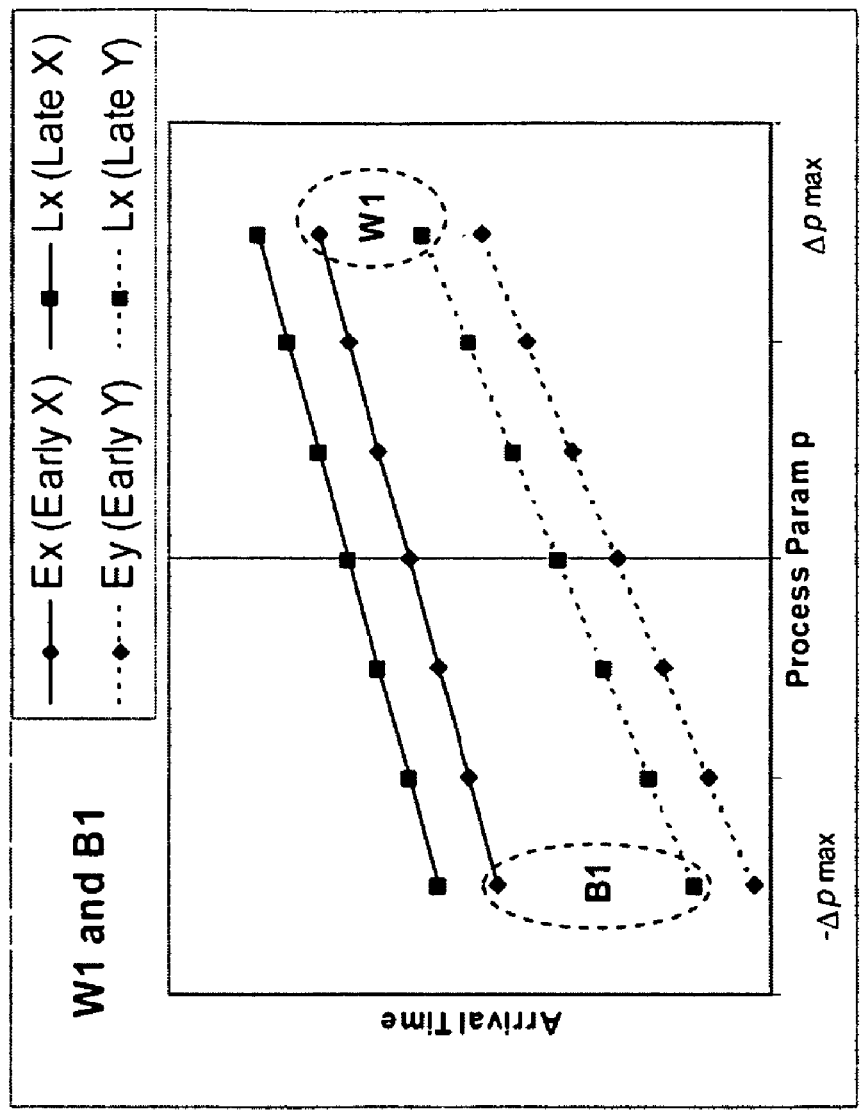
FIGS. 5B-E illustrates conditions of overlap and non-overlap.
Figure 5C:
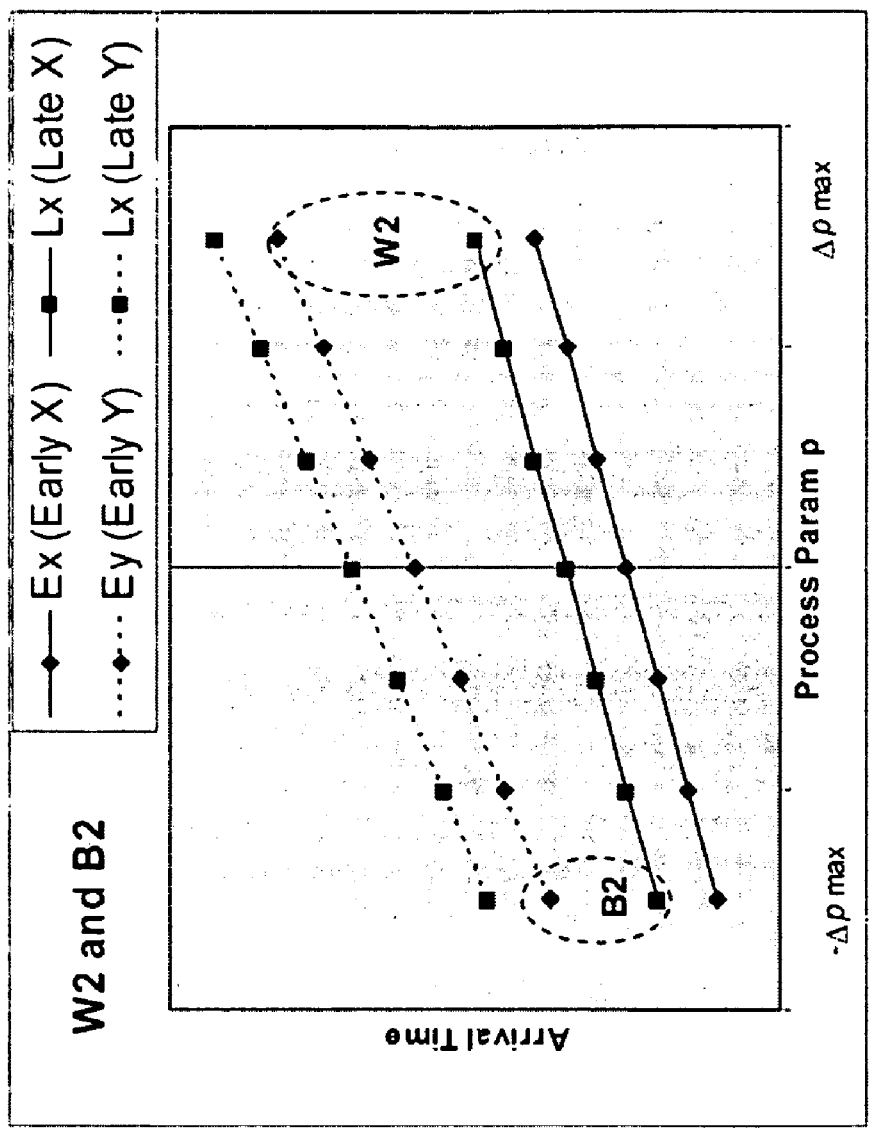

FIG. 5B shows this situation of "W1 and B1". Here, changes have not been plotted in arrival times with change in process parameters. It can be seen if condition "W1 and B1" are met (which are at extreme points $-\Delta p_{max}, \Delta p_{max}$), which ensures this condition to be met at any intermediate value of p. In a similar manner, FIG. 5C shows the situation of "W2 and B2". It can be seen that the condition of "W2 and B2" ensures no overlap at intermediate value of p.

The following condition can be used as well to determine overlaps at intermediate corners:

If (W1 and B1) or (W2 and B2)

Figure 5D:
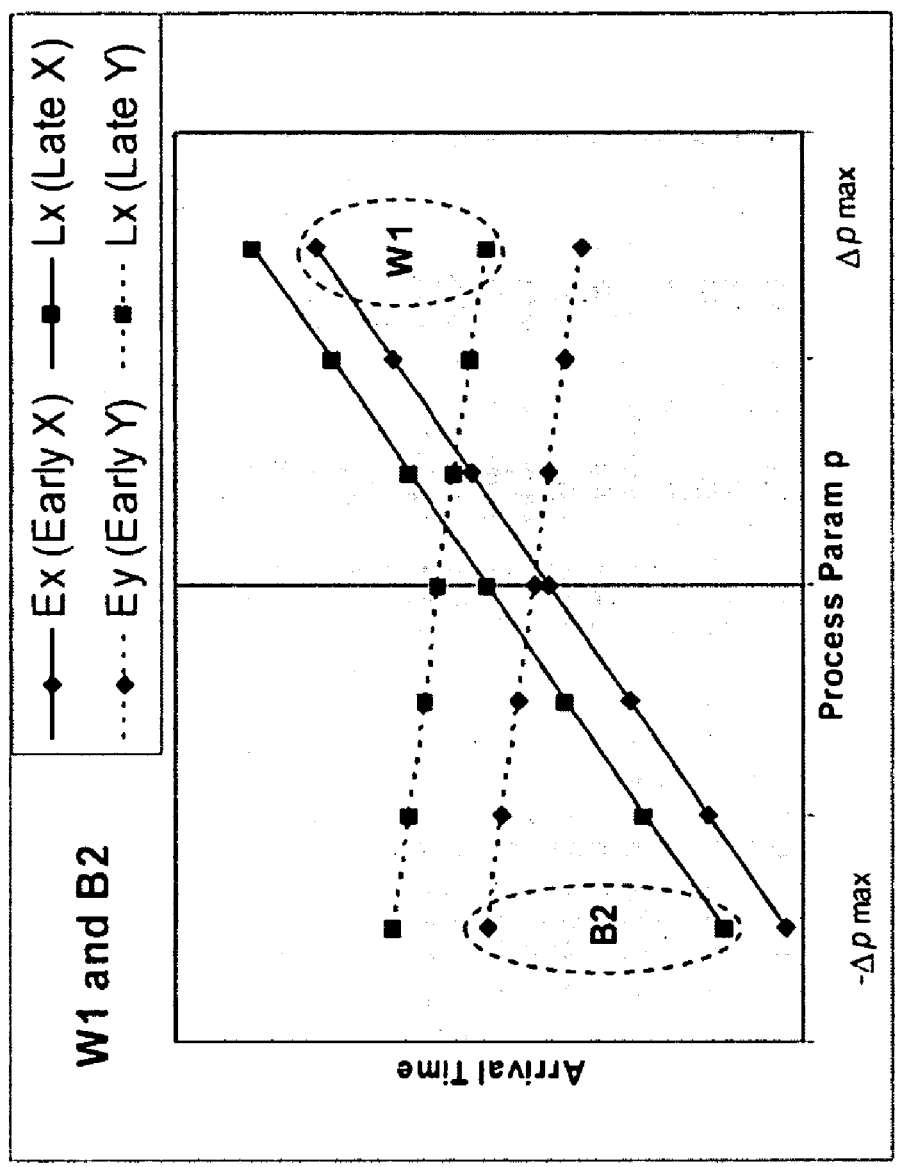
Figure 5E:
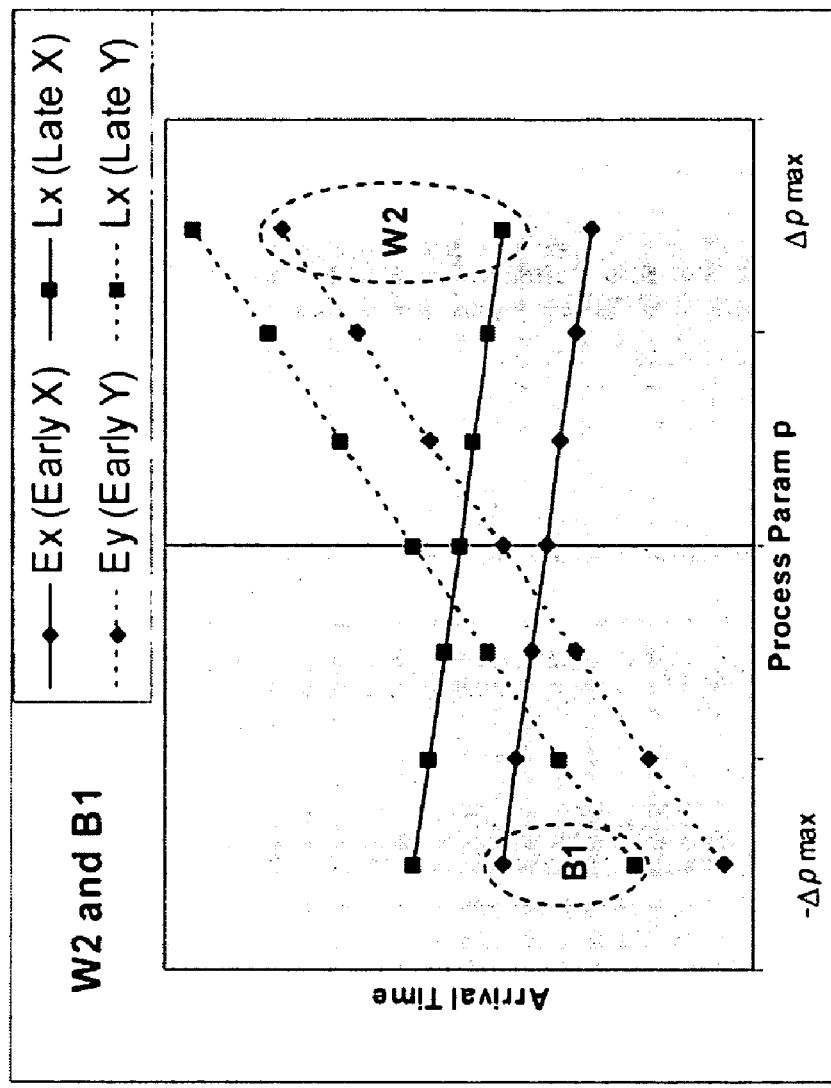

This identifies that net X and net Y will overlap for at least one intermediate value of the process parameter in the range $[-\Delta p_{max}, \Delta p_{max}]$, and this condition is used to ensure that net x and y will overlap for at-least one intermediate value of process parameter in the specified range. FIGS. 5D and 5E show situation of "W1 and B2" and "W2 and B1", respectively. FIG. 5D shows that "W1 and B2" ensures overlap at some intermediate value of p. Similarly, the situation of FIG. 5E shows that "W2 and B1" ensures overlap at sonic intermediate value of p.

Therefore, for a single process parameter, the above process provides an approach for using first-order timing models to determine the existence of crosstalk. The approach takes process variability into account, and can handle complex analysis involving intermediate corner cases.

FIG. 6 shows a flow of a process for performing crosstalk analysis for multiple process parameters. Essentially, if nets are considered overlapping, then they overlap for purposes of any process parameter. An overlap for even a single process parameter indicates the existence of a crosstalk problem that should to be resolved.

At 602, the process identifies the set of process parameters that are to be analyzed. Next, at 604, the process determines whether the process parameters are orthogonal to each other. If so, then at 708, for multiple global process parameters, the process of FIG. 4 is applied separately for each process parameter.

It is quite possible that multiple process parameters are not orthogonal to each other. In this case, at 606, the real parameters would be converted into one or more analyzed parameters for purposes of analysis. Principle component analysis (PCA) can be used as one suitable technique to statistically convert the real process parameters into a set of one or more analyzed parameters that are expressed in terms of the real parameters. For example, it is quite possible that gate length and gate width are two real parameters that are not orthogonal to each other. PCA would be used to convert these parameters into a set of parameters A and B for analysis using the process of FIG. 4.

The results of the analysis would be either, or both, displayed to the user or stored on a computer readable medium at 610.

The invention can also be applied to account for random process parameters. Random variations factor in the effect of random and uncorrelated variations in the various elements of the circuit.

Since the random variations of two nets are uncorrelated, it may be impossible or very difficult to assume any relationship in the random variation for arrival times of the two nets. If random variations in early arrival times of net X is $e^x_{n+1}\Delta R$ with the minimum and maximum values of variation to be $-\Delta e^x_{max}$ and $\Delta e r^x_{max}$, which are chosen in some embodiments to be $-3*sigma$ to $+3sigma$, respectively. $\Delta R$ represents the random component of the source of variation. Similar difficulties arise for late arrival times. The random variations in late arrival times of net X is $l^x_{n+1}\Delta R$ with the minimum and maximum values of variation to be $-\Delta l r^x_{max}$ and $\Delta l r^x_{max}$, which are also chosen to be $-3*sigma$ to $+3sigma$, respectively.

The condition for the two nets X and Y not to overlap at the best corner is represented by the following:

$$E_0^x - e^x \Delta p_{max} - e r^x_{max} > L_0^y - l^y \Delta p_{max} + l r^y_{max} \text{ (Type } B1 \text{ non-overlap)}$$

or $$E_0^y - e^y \Delta p_{max} - e r^y_{max} > L_0^x - l^x \Delta p_{max} + l r^x_{max} \text{ (Type } B2 \text{ non-overlap)}$$

The condition for the two nets X and Y not to overlap at the worst corner is represented by the following:

$$E_0^x + e^x \Delta p_{max} - e r^x_{max} > L_0^y + l^y \Delta p_{max} + l r^y_{max} \text{ (Type } W1 \text{ non-overlap)}$$

or $$E_0^y + e^y \Delta p_{max} - e r^y_{max} > L_0^x + l^x \Delta p_{max} + l r^x_{max} \text{ (Type } W2 \text{ non-overlap)}$$

Therefore, what has been described is an improved approach for performing crosstalk analysis using timing windows. The present invention can identify violations which can be missed using the best/worst cases analysis, while also being far less optimistic than the approach of using combined best/worst case timing windows.

System Architecture Overview

Figure 7:
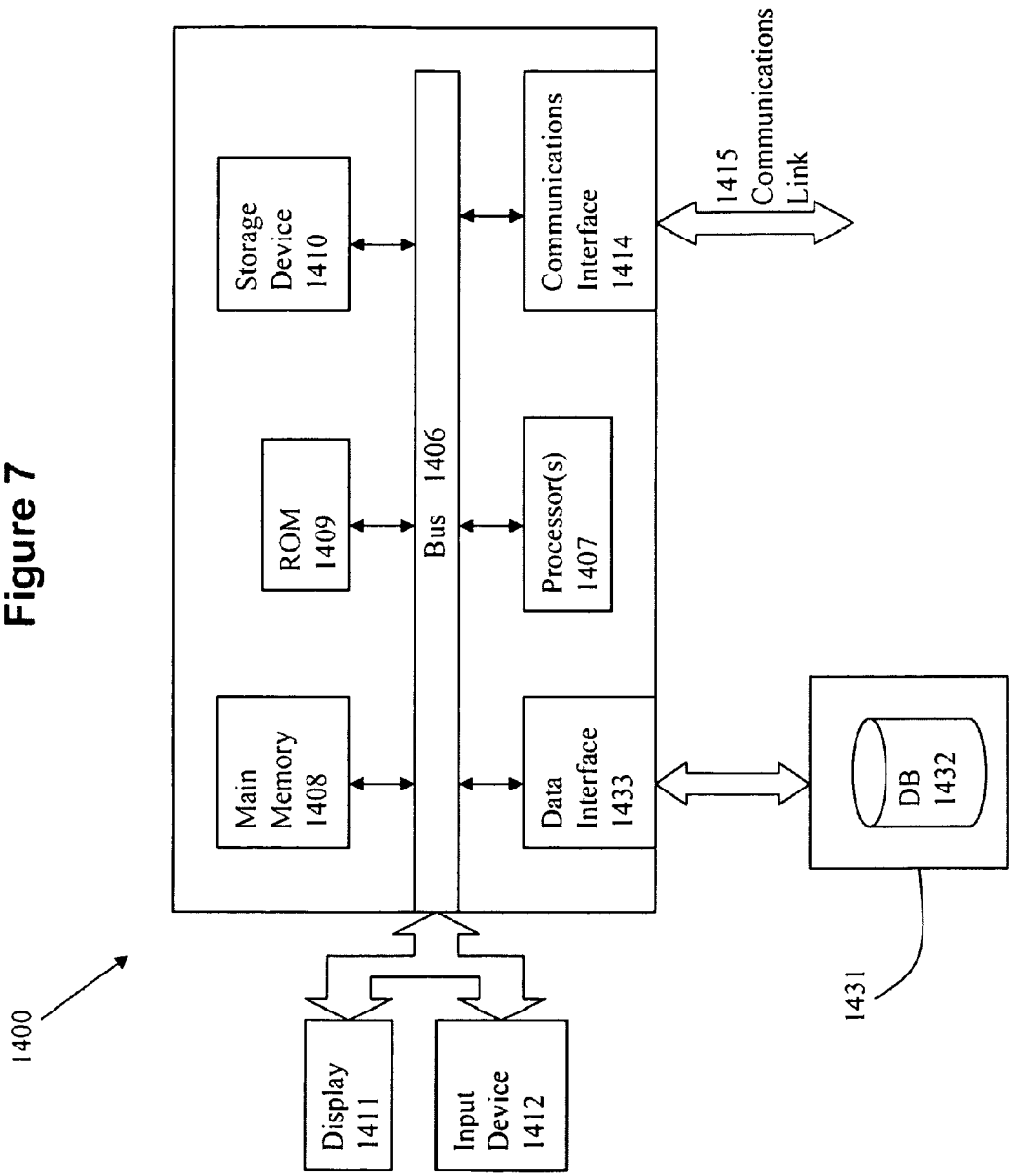
FIG. 7 shows an architecture of an example computing system with which the invention may be implemented.

FIG. 7 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for analyzing an electronic circuit design, comprising:
   using at least one processor to perform a process, the process comprising:
   identifying an electronic design to be analyzed, in which the electronic design is to undergo crosstalk analysis;
   identifying a process parameter that potentially affects manufacture of the electronic design; and
   performing crosstalk analysis of the electronic design to generate analysis results, in which
   the crosstalk analysis is performed by analysis of timing windows corresponding to the electronic design,
   the analysis of the timing windows is performed based at least in part upon one or more models related to the process parameter that considers the effects of process variations, and
   a timing window of the timing windows is bound by at least a first nominal value of a first arrival time and a modified variation value of the first arrival time that corresponds to the process variations and is modified by a sensitivity of the first arrival time to the process parameter.

2. The method of claim 1 in which the one or more timing models comprise first order parameterized models.

3. The method of claim 1 in which the one or more models are generated by characterization of component behavior at various conditions.

4. The method of claim 1 in which the crosstalk analysis uses a model of an arrival time corresponding to the following form:

$$A = A_0 + \sum_{i=1}^{n} s_i \Delta p_i + s_{(n+1)} \Delta R$$

in which, $A_o$, represents a nominal value of the arrival time, $p_i$ represents the process parameter, $s_i$ represents a sensitivity of the arrival time to a process parameter $p_i$, $\Delta R$ represents random variation, and $s_{n+1} \Delta R$ represents random variations in P with standard deviation $s_{(n+1)}$.

5. The method of claim 1 further comprising:
modeling early and late arrival times;
determining the timing windows;
analyzing for best case and worst case overlaps; and
analyzing for intermediate overlaps.

6. The method of claim 5 in which the timing analysis uses the following forms to represent early and late arrival times:

$$E = E_0 + e\Delta p$$

or $$L = L_0 + l\Delta p$$

in which, E represents the early arrival time, L represents the late arrival time, e is an early arrival sensitivity, and is l a late arrival sensitivity.

7. The method of claim 6 in a timing window at a best corner is represented by:

$$[E_0 - e\Delta p_{max}, L_0 - l\Delta p_{max}]$$

or a timing windows at a worst corner is represented by:

$$[E_0 + e\Delta p_{max}, L_0 - l\Delta p_{max}].$$

8. The method of claim 6 in which a condition for two nets X and Y not to overlap at the best corner is represented by the following:

$$E_0^x - e^x \Delta p_{max} > L_0^y - l^y \Delta p_{max} \text{ (Type } B1\text{)}$$

or $$E_0^y - e^y \Delta p_{max} > L_0^x - l^x \Delta p_{max} \text{ (Type } B2\text{)}$$

and a condition for the two nets X and Y not to overlap at the worst corner is represented by the following:

$$E_0^x + e^x \Delta p_{max} > L_0^y l^y \Delta p_{max} \text{ (Type } W1, \text{non-overlap)}$$

or $$E_0^y + e^y \Delta p_{max} > L_0^x l^x \Delta p_{max} \text{ (Type } W2, \text{non-overlap)}.$$

9. The method of claim 8 in which a condition of non-overlap at an intermediate corner is identified using the following:
If (W1 and B1) or (W2 and B2).

10. The method of claim 8 in which a condition of overlap at an intermediate corner is identified using the following:
If (W1 and B2) or (W2 and B1).

11. The method of claim 1 in which the method is repeated for multiple process parameters.

12. The method of claim 1 in which a real process parameter is converted to the process parameter for performing the crosstalk analysis.

13. The method of claim 1 further considering random variations.

14. A computer program product that includes a non-transitory computer readable storage medium, the non-transitory computer readable storage medium comprising a plurality of computer instructions which, when executed by at least one processor, cause the at least one processor to execute performing a process for analyzing an electronic circuit design, the process comprising:
   using at least one processor to perform a process, the process comprising:
      identifying an electronic design to be analyzed, in which the electronic design is to undergo crosstalk analysis;
      identifying a process parameter that potentially affects manufacture of the electronic design; and
      performing the crosstalk analysis of the electronic design to generate analysis results, in which
         the crosstalk analysis is performed by analysis of timing windows corresponding to the electronic design,
         the analysis of the timing windows is performed based at least in part upon one or more models related to the process parameter that considers the effects of process variations, and
         a timing window of the timing windows is bound by at least a first nominal value of a first arrival time and a modified variation value of the first arrival time that corresponds to the process variations and is modified by a sensitivity of the first arrival time to the process parameter.

15. The computer program product of claim 14, in which the one or more timing models comprise first order parameterized models.

16. The computer program product of claim 14, in which the one or more models are generated by characterization of component behavior at various conditions.

17. The computer program product of claim 14, in which the crosstalk analysis uses a model of an arrival time corresponding to the following form:

$$A = A_0 + \sum_{i=1}^{n} s_i \Delta p_i + s_{(n+1)} \Delta R$$

in which, $A_0$ represents a nominal value of the arrival time, $p_i$ represents the process parameter, $s_i$ represents a sensitivity of the arrival time to a process parameter $p_i$, $\Delta R$ represents random variation, and $s_{n+1} \Delta R$ represents random variations in P with standard deviation $s_{(n+1)}$.

18. The computer program product of claim 14, further comprising:
   modeling early and late arrival times;
   determining the timing windows;
   analyzing for best case and worst case overlaps; and
   analyzing for intermediate overlaps.

19. The computer program product of claim 18, in which the crosstalk analysis uses the following forms to represent early and late arrival times:

$$E = E_0 + e\Delta p$$

or $$L = L_0 + l\Delta p$$

in which, E represents the early arrival time, L represents the late arrival time, e is an early arrival sensitivity, and l is a late arrival sensitivity.

20. The computer program product of claim 14, in which the method is repeated for multiple process parameters.

21. The computer program product of claim 14, further considering random variations.

22. A system for analyzing an electronic circuit design, comprising:
   at least one processor that is to:
   identify an electronic design to be analyzed, in which the electronic design is to undergo crosstalk analysis;
   identify a process parameter that potentially affects manufacture of the electronic design; and
   perform crosstalk analysis of the electronic design to generate analysis results, in which
      the crosstalk analysis is performed by analysis of timing windows corresponding to the electronic design,
      the analysis of the timing windows is performed based at least in part upon one or more models related to the process parameter that considers the effects of process variations, and
      a timing window of the timing windows is bound by at least a first nominal value of a first arrival time and a modified variation value of the first arrival time that corresponds to the process variations and is modified by a sensitivity of the first arrival time to the process parameter.

23. The system of claim 22, in which the one or more timing models comprise first order parameterized models.

24. The system of claim 22, in which the one or more models are generated by characterization of component behavior at various conditions.

25. The system of claim 22, in which the crosstalk analysis uses a model of an arrival time corresponding to the following form:

$$A = A_0 + \sum_{i=1}^{n} s_i \Delta p_i + s_{(n+1)} \Delta R$$

in which, $A_0$ represents a nominal value of the arrival time, $p_i$ represents the process parameter, $s_i$ represents a sensitivity of the arrival time to a process parameter $p_i$, $\Delta R$ represents random variation, and $s_{n+1} \Delta R$ represents random variations in P with standard deviation $s_{(n+1)}$.

26. The system of claim 22, the at least one processor is further to:
   model early and late arrival times;
   determine the timing windows;
   analyze best case and worst case overlaps; and
   analyze intermediate overlaps.

27. The system of claim 26, in which the crosstalk analysis uses the following forms to represent early and late arrival times:

$$E = E_0 + e\Delta p$$

or $$L = L_0 + l\Delta p$$

in which, E represents the early arrival time, L represents the late arrival time, e is an early arrival sensitivity, and l is a late arrival sensitivity.

28. The system of claim 22, in which multiple process parameters are analyzed.

29. The system of claim 22, in which the at least one processor is further to consider random variations.

* * * * *